(12) United States Patent
Hurst

(10) Patent No.: US 8,020,110 B2
(45) Date of Patent: Sep. 13, 2011

(54) METHODS FOR DEFINING QUERIES, GENERATING QUERY RESULTS AND DISPLAYING SAME

(75) Inventor: David Hurst, Swarthmore, PA (US)

(73) Assignee: WeiserMazars LLP, New York, NY (US)

( * ) Notice: Subject to any disclaimer, the term of this patent is extended or adjusted under 35 U.S.C. 154(b) by 4 days.

(21) Appl. No.: 11/440,568

(22) Filed: May 25, 2006

(65) Prior Publication Data

US 2006/0271884 A1 Nov. 30, 2006

Related U.S. Application Data

(60) Provisional application No. 60/684,822, filed on May 26, 2005, provisional application No. 60/785,111, filed on Mar. 23, 2006.

(51) Int. Cl.
G06F 3/048 (2006.01)
G06F 3/00 (2006.01)

(52) U.S. Cl. ......... 715/765; 715/762; 715/763; 715/825

(58) Field of Classification Search .................. 715/762, 715/763, 765, 788, 825, 848
See application file for complete search history.

(56) References Cited

U.S. PATENT DOCUMENTS

| | | | |
|---|---|---|---|
| 5,428,776 A * | 6/1995 | Rothfield | 1/1 |
| 5,546,529 A | 8/1996 | Bowers et al. | |
| 5,671,381 A | 9/1997 | Strasnick et al. | |
| 5,761,685 A | 6/1998 | Hutson | |
| 5,835,094 A * | 11/1998 | Ermel et al. | 715/848 |
| 5,847,709 A | 12/1998 | Card et al. | |
| 5,861,885 A | 1/1999 | Strasnick et al. | |
| 5,905,992 A | 5/1999 | Lucas et al. | |
| 5,973,695 A * | 10/1999 | Walsh et al. | 715/854 |
| 6,012,072 A | 1/2000 | Lucas et al. | |
| 6,088,032 A | 7/2000 | Mackinlay | |
| 6,121,969 A | 9/2000 | Jain et al. | |
| 6,154,213 A | 11/2000 | Rennison et al. | |

(Continued)

FOREIGN PATENT DOCUMENTS

JP 2000250909 9/2000

OTHER PUBLICATIONS

International Search Report; International Application No. PT/US07/07138; International Filing Date Mar. 22, 2007; 10 pages.

(Continued)

Primary Examiner — Nicholas Augustine
(74) Attorney, Agent, or Firm — Blank Rome LLP

(57) ABSTRACT

Documents are grouped into a plurality of subjects. For documents associated with each subject, a document hierarchy is established that includes a plurality of hierarchical levels. A three-dimensional landscape defined by x, y and z orthogonal axes is displayed on a screen, and a plurality of document stacks are arranged in the landscape. Each document stack in the landscape corresponds to a subject, and has a plurality of layers arranged perpendicular to the length of the stack. Each layer in each document stack corresponds to one of the hierarchical levels of the hierarchy established for the subject corresponding to the stack. Images representing documents assigned to each level of the hierarchy are displayed in the layer of the stack corresponding to such level. A user navigates among the document images displayed in the landscape using a cursor.

10 Claims, 15 Drawing Sheets

U.S. PATENT DOCUMENTS

| | | | |
|---|---|---|---|
| 6,160,553 A * | 12/2000 | Robertson et al. | 715/767 |
| 6,208,985 B1 * | 3/2001 | Krehel | 707/3 |
| 6,297,824 B1 | 10/2001 | Hearst et al. | |
| 6,370,537 B1 | 4/2002 | Gilbert et al. | |
| 6,418,428 B1 * | 7/2002 | Bosch et al. | 1/1 |
| 6,437,805 B1 * | 8/2002 | Sojoodi et al. | 715/763 |
| 6,463,428 B1 | 10/2002 | Lee et al. | |
| 6,466,237 B1 | 10/2002 | Miyao et al. | |
| 6,473,751 B1 | 10/2002 | Nikolovska et al. | |
| 6,484,190 B1 * | 11/2002 | Cordes et al. | 715/207 |
| 6,499,029 B1 | 12/2002 | Kurapati et al. | |
| 6,505,194 B1 | 1/2003 | Nikolovska et al. | |
| 6,584,220 B2 | 6/2003 | Lantrip et al. | |
| 6,650,343 B1 | 11/2003 | Fujita et al. | |
| 6,701,318 B2 | 3/2004 | Fox et al. | |
| 6,915,308 B1 * | 7/2005 | Evans et al. | 1/1 |
| 6,925,608 B1 * | 8/2005 | Neale et al. | 715/763 |
| 6,947,929 B2 * | 9/2005 | Bruce et al. | 707/5 |
| 6,961,731 B2 | 11/2005 | Holbrook | |
| 7,373,341 B2 * | 5/2008 | Polo-Malouvier | 707/3 |
| 7,383,503 B2 * | 6/2008 | Banks | 715/273 |
| 7,383,513 B2 * | 6/2008 | Goldberg et al. | 715/763 |
| 7,447,687 B2 * | 11/2008 | Andersch et al. | 707/5 |
| 7,490,073 B1 * | 2/2009 | Qureshi et al. | 706/50 |
| 7,552,395 B2 * | 6/2009 | Neale et al. | 715/763 |
| 7,667,582 B1 * | 2/2010 | Waldorf | 340/440 |
| 2002/0152222 A1 | 10/2002 | Holbrook | |
| 2003/0011601 A1 | 1/2003 | Itoh et al. | |
| 2003/0065541 A1 * | 4/2003 | Menninger | 705/7 |
| 2003/0065650 A1 * | 4/2003 | Annand et al. | 707/3 |
| 2003/0117434 A1 | 6/2003 | Hugh | |
| 2003/0126136 A1 | 7/2003 | Omoigui | |
| 2003/0144868 A1 * | 7/2003 | MacIntyre et al. | 705/1 |
| 2003/0144996 A1 | 7/2003 | Moore, Jr. | |
| 2003/0164827 A1 | 9/2003 | Gottesman et al. | |
| 2003/0197731 A1 | 10/2003 | Chiu et al. | |
| 2003/0227487 A1 | 12/2003 | Hugh | |
| 2004/0030685 A1 * | 2/2004 | Helles et al. | 707/3 |
| 2004/0030741 A1 | 2/2004 | Wolton et al. | |
| 2004/0036716 A1 | 2/2004 | Jordahl | |
| 2004/0090472 A1 | 5/2004 | Risch et al. | |
| 2004/0103090 A1 | 5/2004 | Dogl et al. | |
| 2004/0177319 A1 | 9/2004 | Horn | |
| 2004/0267701 A1 | 12/2004 | Horvitz et al. | |
| 2005/0005246 A1 | 1/2005 | Card et al. | |
| 2005/0132303 A1 * | 6/2005 | Grotjohn | 715/853 |
| 2005/0159957 A1 * | 7/2005 | Roth et al. | 704/276 |
| 2005/0192953 A1 * | 9/2005 | Neale et al. | 707/4 |
| 2005/0289100 A1 * | 12/2005 | Dettinger et al. | 707/1 |
| 2006/0004746 A1 | 1/2006 | Angus et al. | |
| 2006/0036568 A1 * | 2/2006 | Moore et al. | 707/1 |

OTHER PUBLICATIONS

Wolf, Peter; "Three-Dimensional Information Visualisation: The Harmony Information Landscape"; Thesis; Fertigstellung: 1.5.1996; 105 pages.

Cugini et al.; "Design of 3-D Visualization of Search Results: Evolution and Evaluation"; National Institute of Standards and Technology, Gaithersburg, MD 20899 and the Catholic University of America, Washington, DC 20064; 13 pages, 2000.

Kienreich et al.; "InfoSky: A System for Visual Exploration of Very Large, Hierarchically Structured Knowledge Spaces"; 7 pages, 2003.

Young, Peter; "Three-Dimension Information Visualisation"; Visualisation Research Group, Research Institute in Software Evolution; Nov. 1, 1996; <http://vrg.dur.ac.uk/misc/PeterYoung/pages/work/documents>; 40 pages.

Wiss, et al.; "A Cognitive Classification Framework for 3-Dimensional Information Visualization"; Lulea University of Technology; 17 pages, 1998.

Kim, Mansoo; "A Three-Dimensional Index Visualizer on World Wide Web"; Natural Language Processing Section Electronics and Telecommunications Research Institute <http://www.csu.edu.au/special/conference/apwww95/papers95/mkim/mkim.html>; downloaded Apr. 4, 2005; pp. 1-12.

Geisler, Gary; "Making Information More Accessible: A Survey of Information Visualization Applications and Techniques"; <http://www.ils.unc.edu/~geisg/info/infovis/paper.html>; downloaded Apr. 4, 2005; pp. 1-17.

Andrews, Keith; "Spatial Metaphors for Information Systems"; Institute for Information Processing and Computer Supported New Media (IICM); Graz University of Technology, Graz, Austria; ECHT'94 Workshop, Sunday, Sep. 18, 1994; <http://www2.iicm.edu/echt94/spatial.html>; downloaded Apr. 4, 2005; pp. 1-5.

* cited by examiner

Process Hierarchy Report

| Process | Sub-Process | Tasks |
|---|---|---|

Supply Chain Management

Order Management

*Order Entry*

Submit Order

Enter Order Lines

Enter Order Header

*Order Inquiry*

Check Order History

Check Order Status

Find Order

*Order Update*

Update Order Status

Update Order Lines

Update Order Header

Figure 10

| | Application | SAP R/3 | | | | | |
|---|---|---|---|---|---|---|---|
| | Module | SD - Sales and Distribution | | | | FI - Financial Accounting | |
| Process / Sub-Process / Task | Screen | Master Order Screen | Order Detail Screen | Order Status Screen | Order Inquiry Screen | Pricing Detail Screen | Reconciliation Screen |
| Supply Chain Management | | | | | | | |
| Order Management | | | | | | | |
| Order Entry | | | | | | | |
| Enter Order Header | | ☑ | | | | | |
| Enter Order Lines | | ☑ | ☑ | | | | |
| Submit Order | | ☑ | ☑ | | | ☑ | |
| Order Inquiry | | | | | | | |
| Check Order History | | | | ☑ | ☑ | | |
| Check Order Status | | | ☑ | ☑ | | | |
| Find Order | | | | | ☑ | | |
| Order Update | | | | | | | |
| Update Order Status | | ☑ | ☑ | ☑ | | | |
| Update Order Lines | | | ☑ | ☑ | | | |
| Update Order Header | | ☑ | | ☑ | | | |

Figure 11

METHODS FOR DEFINING QUERIES, GENERATING QUERY RESULTS AND DISPLAYING SAME

CROSS-REFERENCE TO RELATED APPLICATIONS

The present application claims priority to U.S. Provisional Application No. 60/684,822 filed May 26, 2005 entitled "Three-Dimensional Landscape For Presenting Documents and Iterative Query Results" and U.S. Provisional Application No. 60/785,111 filed Mar. 23, 2006 entitled "CogniViz Tree and Tunnel Query (TTQ) Interface," the contents of which are hereby incorporated herein by reference.

FIELD OF THE INVENTION

The present invention relates to methods for defining queries, generating query results and displaying information to a user on a two-dimensional screen.

SUMMARY OF THE INVENTION

The present invention is directed to a method and system for displaying and navigating among images of documents on a two-dimensional screen. The documents are grouped into a plurality of subjects. For documents associated with each subject, a document hierarchy is established that includes a plurality of hierarchical levels and each of the documents associated with the subject is assigned to one of the hierarchical levels. A three-dimensional landscape defined by x, y and z orthogonal axes is displayed on the screen, and a plurality of document stacks are arranged in the three-dimensional landscape. Each document stack in the three-dimensional landscape corresponds to one of the subjects, each document stack has a plurality of layers arranged perpendicular to a length of the document stack, and each of the layers is parallel to a plane defined by the x and z axes. For each document stack, each layer in the document stack corresponds to one of the hierarchical levels of the document hierarchy established for the subject corresponding to the document stack. In addition, for each document stack, an image is displayed representing each document in the group of documents associated with the subject corresponding to the stack; the displaying is performed in accordance with the hierarchy established for the subject such that one or more images representing documents assigned to each level of the hierarchy are displayed in the layer of the stack corresponding to such level. A user navigates among the images representing the documents displayed in the three-dimensional landscape by moving a cursor within the two-dimensional screen.

In accordance with a further aspect, the present invention is directed to a method for displaying and navigating among information on a two-dimensional screen. A plurality of documents are displayed in a three-dimensional landscape defined by x, y and z orthogonal axes on the screen. A plurality of document planes are arranged in the three-dimensional landscape. Each of the document planes is parallel to a plane defined by the y and z axes. The documents are separated into a plurality of document groups as a function of a first parameter and each of the document planes is associated with one of the document groups. Each of the document planes corresponds to a respective value of the first parameter and is disposed at a position along the x-axis in accordance with the respective value of the first parameter. For each document group, an image of each document in the group is displayed in the document plane associated with the document group. A common positioning rule is applied to each document group such that the images of the documents in the document plane associated with the document group are uniformly positioned across all planes associated with the document groups.

In accordance with yet a further aspect, the present invention is directed to a method of defining a query and generating a resulting tree. Nodes and edges are graphically selected and placed in a window in a graphical user interface in order to create a vertical stack of nodes and edges respectively representing object types and link types. The query is defined based on the stack. A resulting tree is generated by applying the query to an underlying data store, wherein a top node of the stack defines one or more top-level elements in the resulting tree, a node below the top node of the stack defines child elements of the one or more top-level elements of the resulting tree, and an edge of the stack connecting the top node and the node below the top node defines the relationship between the one or more top-level elements and their child elements in the resulting tree.

In some embodiments, hierarchical information from recursive data links is included in the query by inserting a graphical edge connecting a node with itself into the window. The query may be defined to return multiple linked resulting trees, and the stack may correspond to two or more stacks with an edge between at least one node in each of the stacks. Output from the query may be filtered using one or more filters placed at a query, tree, object or link level and represented within the graphical user interface as one or more icons. Sub queries may be defined for identifying subsets of data within the query by adding filter icons and inter-tree links to the graphical user interface that are color coded with a specific color corresponding to each sub query.

BRIEF DESCRIPTION OF THE DRAWINGS

FIG. 10 illustrates an exemplary grouped output report generated by the graphical interface of the present invention.

FIG. 11 illustrates an exemplary matrix output report generated by the graphical interface of the present invention.

DETAILED DESCRIPTION OF THE PREFERRED EMBODIMENTS

Figure 1:
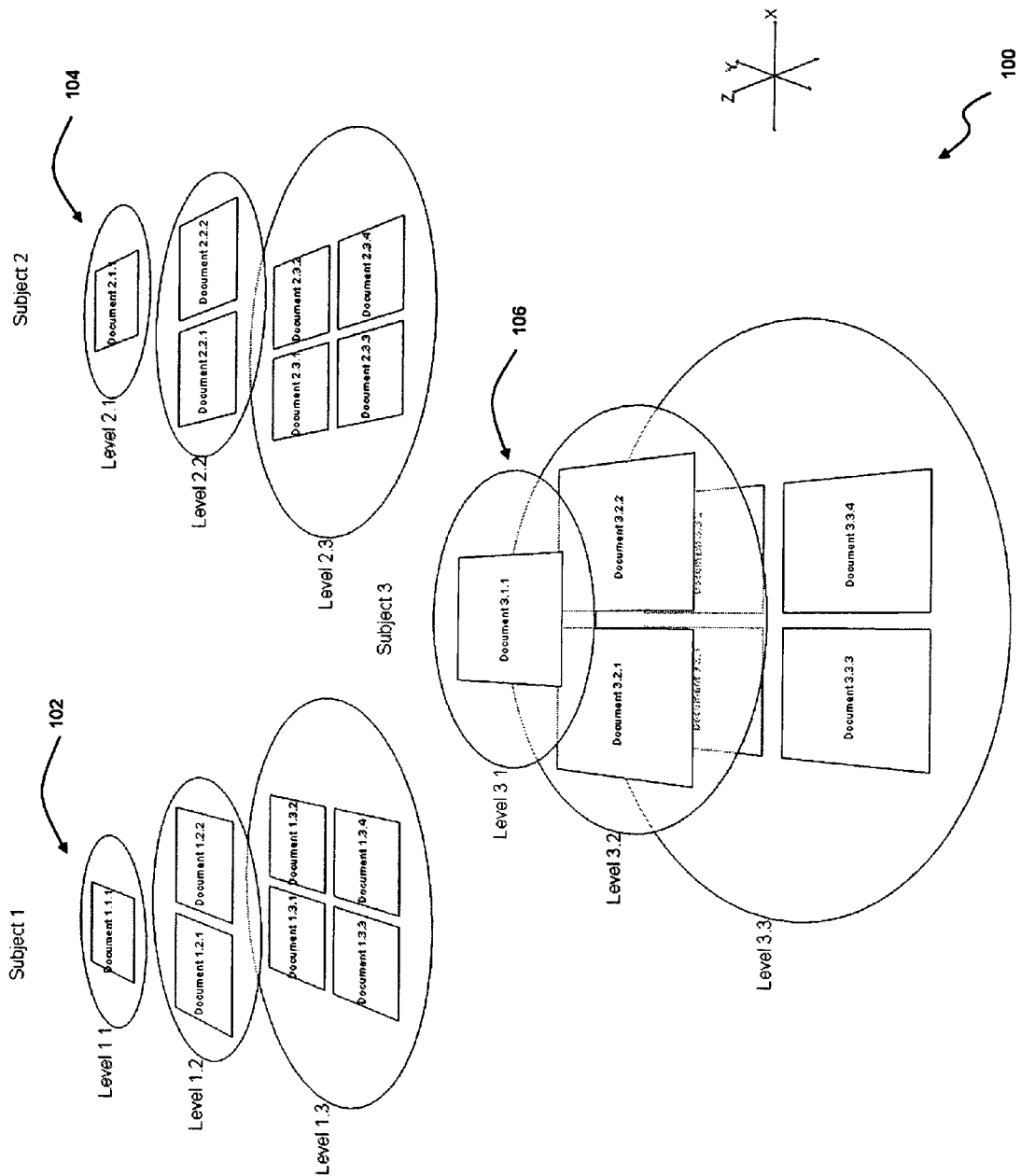
FIG. 1 illustrates a method for displaying images of documents on a two-dimensional screen, in accordance with a first embodiment of the present invention.

FIG. 1 illustrates a method and system for displaying and navigating among images of documents on a two-dimensional screen 100. The document images are grouped into a plurality of subjects (e.g., subject 1, subject 2, subject 3). A document hierarchy is established for documents associated with each subject. Each document hierarchy includes a plurality of hierarchical levels (e.g., for subject 1, level 1.3 includes detail level documents, level 1.2 includes relatively granular summary level documents, and level 1.1 includes relatively coarse summary level documents) and each of the documents associated with the subject is assigned to one of the hierarchical levels.

A three-dimensional landscape defined by x, y and z orthogonal axes is displayed on the screen 100. A plurality of document stacks 102, 104, 106 are arranged in the three-dimensional landscape. Each document stack corresponds to one of the subjects, and has a plurality of layers arranged perpendicular to a length of the document stack. Each of the layers is parallel to a plane defined by the x and z axes. For each document stack, each layer in the document stack corresponds to one of the hierarchical levels of the document hierarchy established for the subject corresponding to the document stack.

For each document stack, an image is displayed in the three-dimensional landscape representing each document in the group of documents associated with the subject corresponding to the stack. This displaying is performed in accordance with the hierarchy established for the subject such that one or more images representing documents assigned to each level of the hierarchy are displayed in the layer of the stack corresponding to such level. The user navigates among the images representing the documents displayed in the three-dimensional landscape by moving a cursor within the two-dimensional screen 100.

Figure 2:
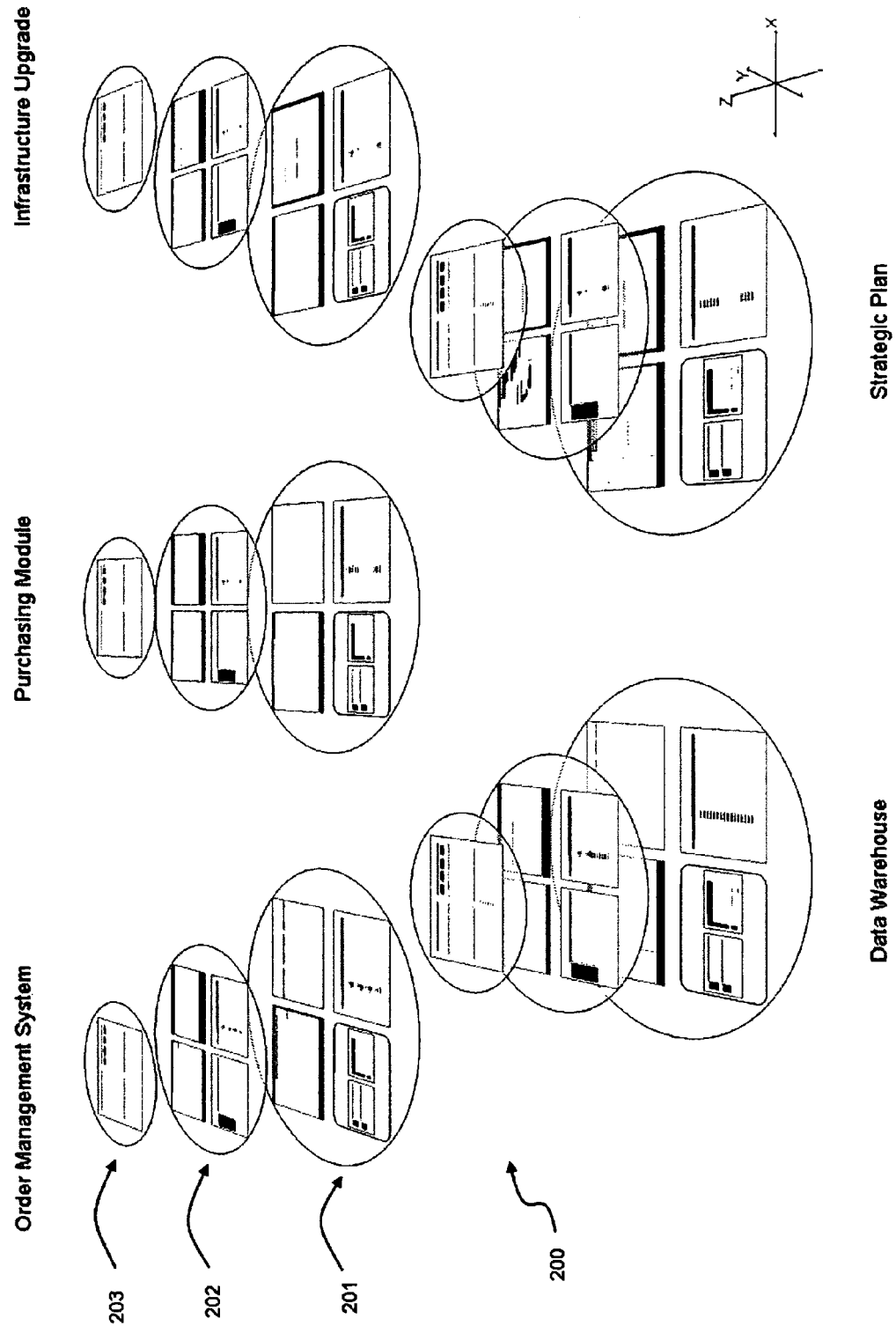
FIG. 2 illustrates an application of the method of FIG. 1 for displaying images of documents relating to the management of five projects within an organization, in accordance with the first embodiment of the present invention.

FIG. 2 illustrates an application of the method of FIG. 1 for displaying images of documents relating to the management of five projects within an organization on two-dimensional screen 200, in accordance with the first embodiment of the present invention. In the example of FIG. 2, the document images are grouped into five subjects (e.g., order management system, purchasing module, infrastructure upgrade, data warehouse and strategic plan), each of which corresponds to an existing project being management within an exemplary organization. A document hierarchy is established for documents associated with each of the five projects. The document hierarchy for each of the five projects includes a plurality of hierarchical levels (e.g., for the order management system project, level 201 includes detail level documents for the project, level 202 includes relatively granular summary level documents for the project, and level 203 includes relatively coarse summary level documents for the project).

Figure 3:
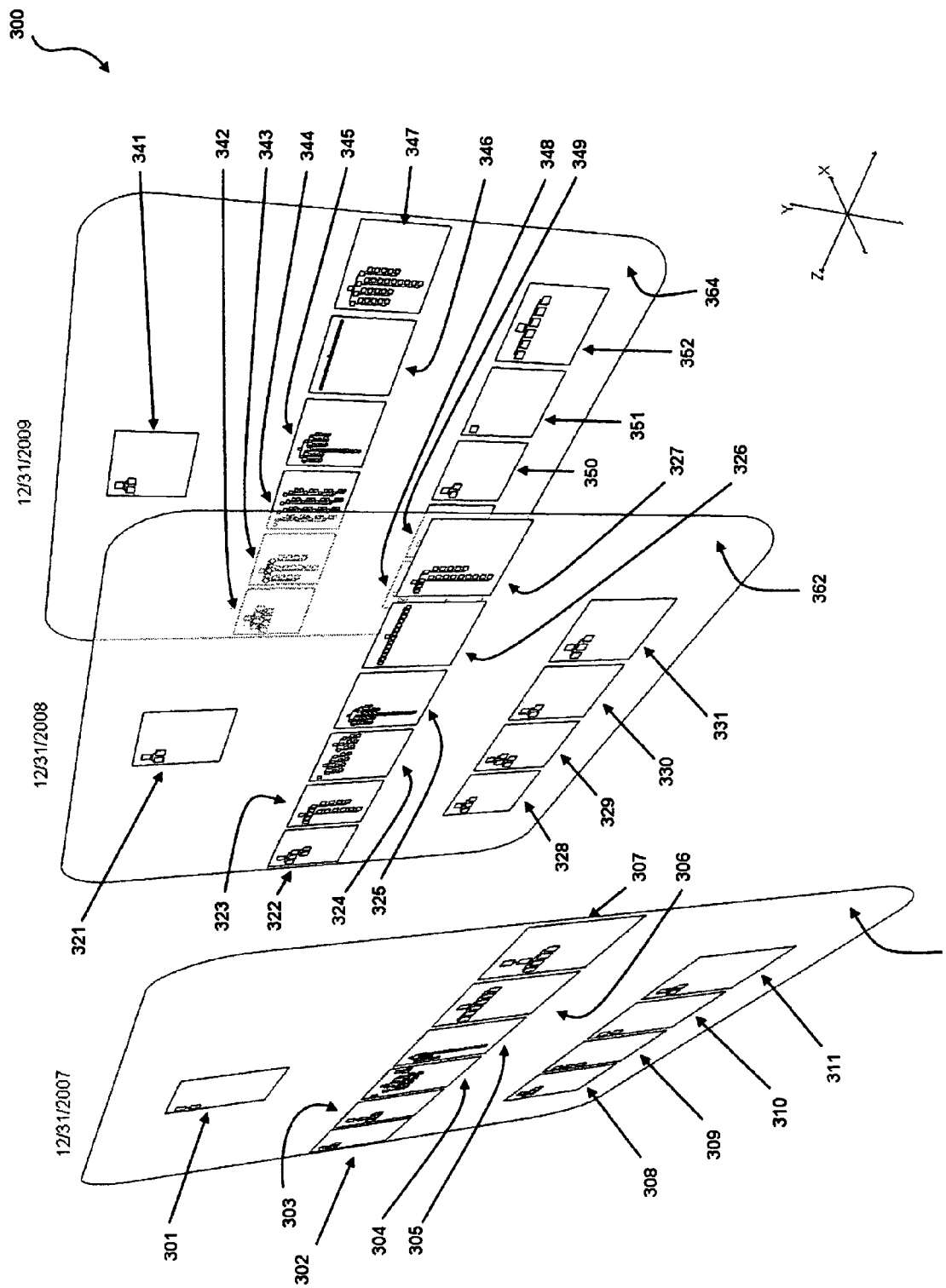
FIG. 3 illustrates a method for displaying images of documents on a two-dimensional screen, in accordance with a second embodiment of the present invention.
Figure 8:
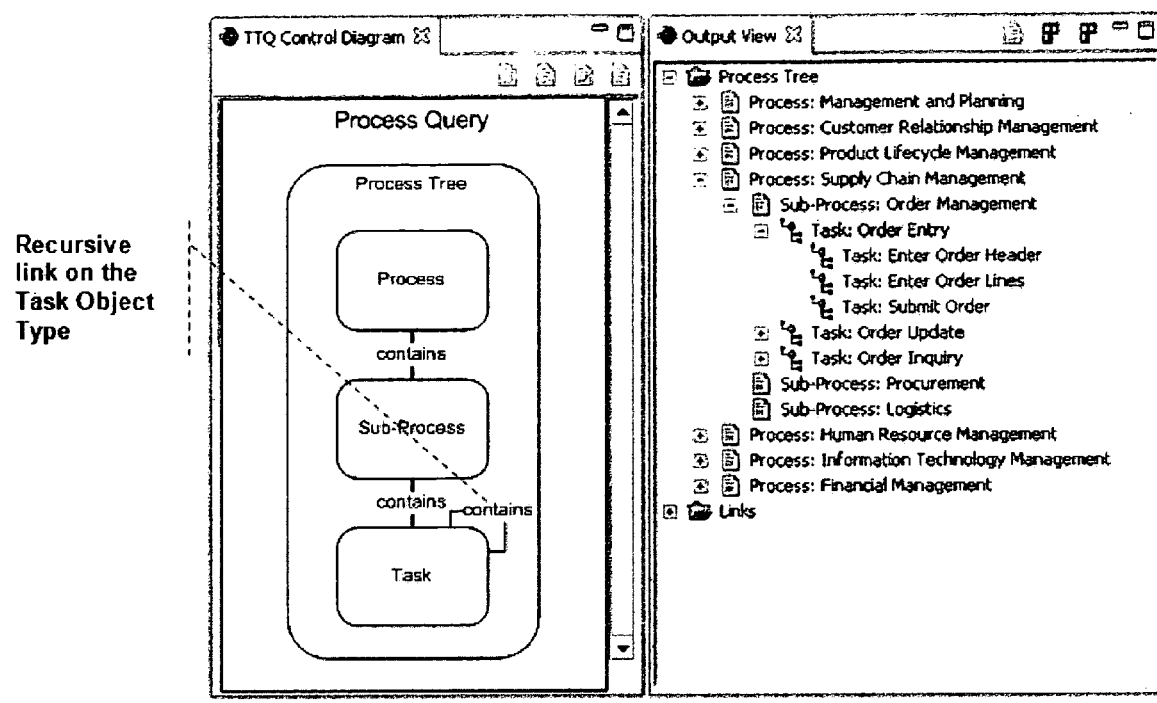
FIG. 8 illustrates a further view of the graphical user-interface of FIG. 4.

FIG. 3 illustrates a method for displaying images of documents on a two-dimensional screen 300, in accordance with a second embodiment of the present invention. A plurality of documents 301-311, 321-331, and 341-351 are displayed in a three-dimensional landscape defined by x, y and z orthogonal axes on the screen 300. A plurality of document planes 360, 362, 364 are arranged in the three-dimensional landscape. Each of the document planes 360, 362, 364 is parallel to a plane defined by the y and z axes. The documents 301-311, 321-331, and 341-352 are separated into a plurality of document groups as a function of a first parameter and each of the document planes is associated with one of the document groups. In the example of FIG. 8, which is used for displaying documents that show personnel and reporting structure changes in an organization over a three-year period, the first parameter corresponds to time, the first document plane 360 corresponds to the year 2007, the second document plane 362 corresponds to the year 2008 and the third document plane 2009 corresponds to the year 2009.

Referring still to FIG. 3, documents in a first document group (i.e., documents 301-311) are positioned in the first document plane 360. Each document in the first document group (i.e., documents 301-311) shows personnel and a reporting structure for a particular division or department in the organization for the year 2007. The documents in the first document group (i.e., documents 301-311) are arranged within document plane 360 in a manner that illustrates hierarchies between divisions or departments in the organization for the year 2007.

Similarly, documents in a second document group (i.e., documents 321-331) are positioned in the second document plane 362. Each document in the second document group (i.e., documents 321-331) shows personnel and a reporting structure for a particular division or department in the organization for the year 2008. The documents in the second document group (i.e., documents 321-331) are arranged within document plane 362 in a manner that illustrates hierarchies between divisions or departments in the organization for the year 2008. Continuing with the example of FIG. 8, documents in a third document group (i.e., documents 341-352) are positioned in the third document plane 364. Each document in the third document group (i.e., documents 341-352) shows personnel and a reporting structure for a particular division or department in the organization for the year 2009. The documents in the third document group (i.e., documents 341-352) are arranged within document plane 365 in a manner that illustrates hierarchies between divisions or departments in the organization for the year 2009.

As shown in FIG. 3, a common positioning rule is applied to each of the three document groups such that the images of the documents in the document plane associated with the document group are uniformly positioned across all planes associated with the document groups. Thus, for example, to the extent that a particular department or division is present in the organization in years 2007, 2008 and 2009, a document illustrating the personnel with such department or organization will appear at the same location in each of the three document planes 360, 362, 364, thereby making it easier for a user to identify changes from year to year. The user navigates among the images representing the documents displayed in the three-dimensional landscape by moving a cursor within the two-dimensional screen 300. In one embodiment, the user may view any of the documents 301-311, 321-331, and 341-352 in further detail by clicking on the image of a particular document, thereby causing a larger version of the selected document to be shown to the user in enlarged form.

Figure 4:
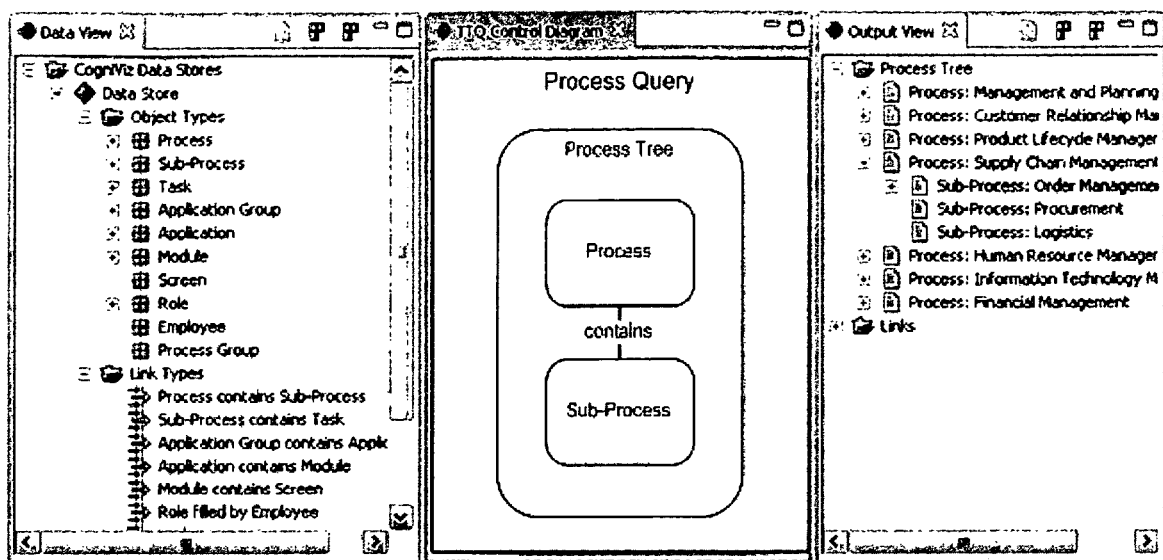
FIG. 4 illustrates a graphical user-interface for organizing data and generating three-dimensional landscapes.

FIG. 4 illustrates a graphical user-interface for organizing data and generating the three-dimensional landscapes described above. Among other things, the interface implements a graphical querying mechanism for creating and modifying complex multi-dimensional, hierarchical queries against knowledge bases. The interface can be used to (i) create Queries containing one or more information hierarchies, or Trees, composed of an ordered parent-child list of Objects connected by Links, (ii) define connections, or Tunnels, between Trees within the Query using links between Objects in each Tree, (iii) filter the resulting output at a variety of levels based on Object and Link properties, and (iv) generate textual and graphical output from the Query or send output to other programs for additional processing.

The interface shown in FIG. 4 uses a Data Store to get source data and uses Output views as a means of displaying query results. The main user interface component is a graphical querying interface called a Control Diagram 401. The Control Diagram 401 provides an interactive graphical representation of the Query being constructed and lets the user add, remove, or modify components of the Query using intuitive drag-and-drop actions.

The flexibility of querying with the interface of FIG. 4 is enabled by the specialized metadata and the data storage structure in the Data Store, which uses an internal data model to map all source system metadata. This model has eight primary components, four dealing with data elements and four dealing with corresponding metadata. These are laid out in Table I below.

TABLE I

| Data Components | Metadata Components |
| --- | --- |
| Object | Object Type |
| Link | Link Type |
| Object Property | Object Property Type |
| Link Property | Link Property Type |

Object and Link Properties and Property Types are discussed below. The list in Table II represents an example of how the metadata and data associated with Objects and Links are used. The example of Table II is based on a hypothetical Business Process management database which is used throughout the remainder of this disclosure.

TABLE II

| Data Components | Metadata Components |
| --- | --- |
| Object: Supply Chain Management | Object Type: Process |
| Link: Supply Chain Management contains Order Management | Link Type: Process contains Sub-Process |

Figure 5:
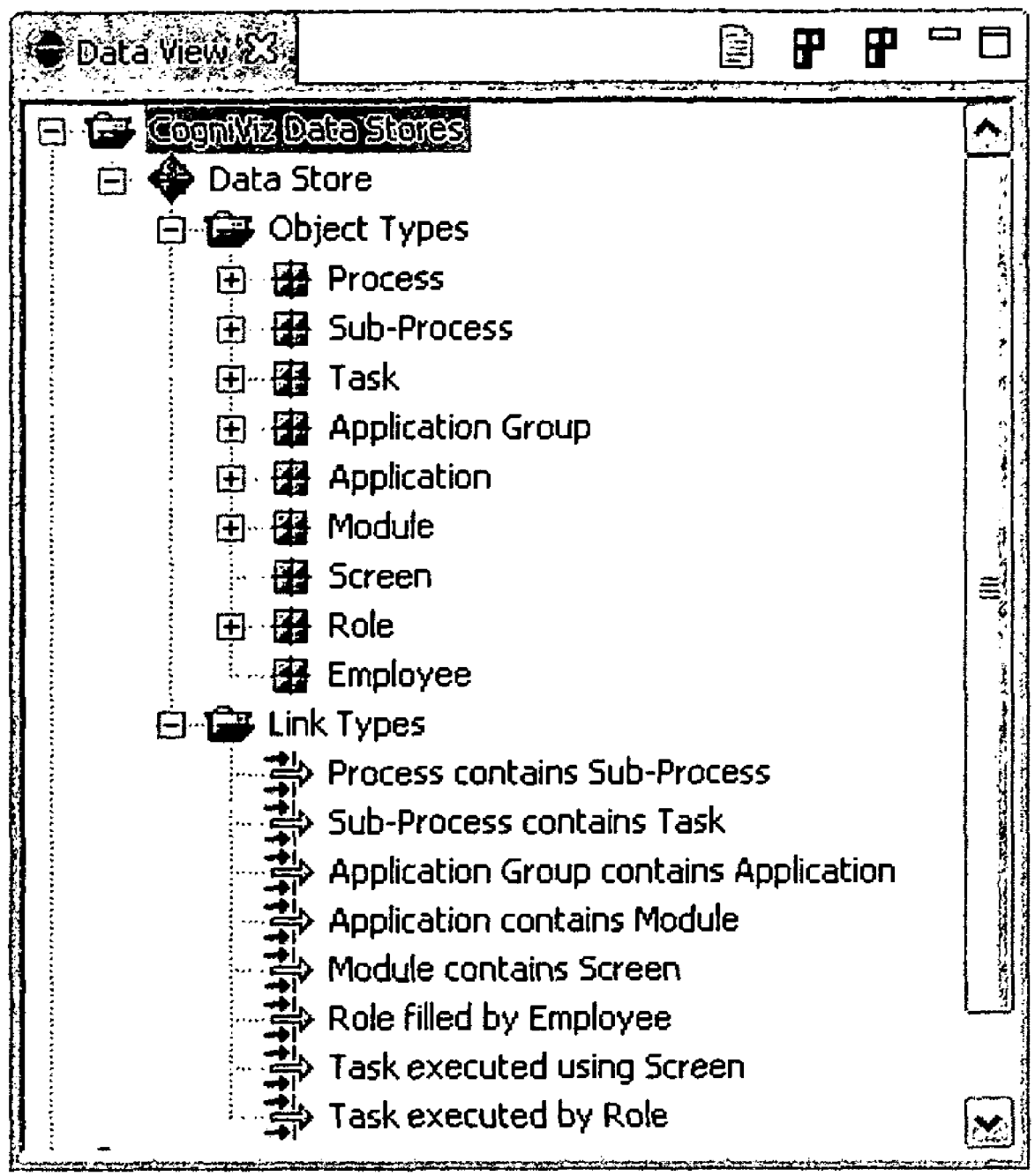
FIG. 5 illustrates a further view of the graphical user-interface of FIG. 4.

FIG. 5 illustrates the Data View portion of the interface of FIG. 4, which allows the user to browse the Data Store metadata structure. The Data Store structure is designed to be easily compatible with standard description logics such as Resource Description Framework (RDF), Web Ontology Language (OWL), and Topic Maps. These and other ontology definition languages make use of similar approaches to representing knowledge structures and can be mapped to the model described above.

The Data Store structure is implemented at a logical level, but may not necessarily represent the underlying physical database structure. It is expected that the system of the present invention will be run against a variety of native storage schemes including normalized relational databases, OLAP/BI databases, and XML. The present invention translates the metadata and data provided by these source systems into the appropriate metadata and data either via data loading transformations or real-time data transformations. To facilitate navigation of the metadata repository, the user-interface supports grouping of Object Types and Link Types. This allows the user or administrator of the system to set up logical groupings of Object Types and Link Types that are commonly used together.

Figure 6:
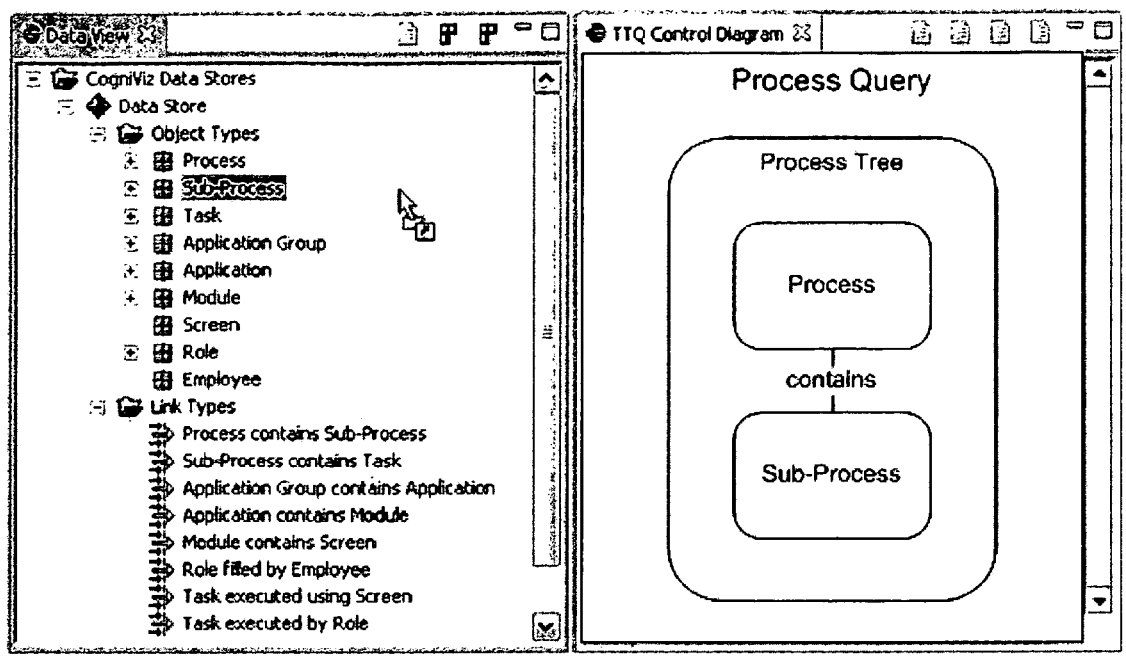
FIG. 6 illustrates a further view of the graphical user-interface of FIG. 4.

For purposes of this disclosure, a Tree of information is defined via one or more Object Types and one or more associated Link Types from the Data Store. A simple Query with a single two-level Tree, for example could be created with two Object Types: 'Process' and 'Sub-process'. The Tree's Parent-Child Link is supplied by the Link Type 'Process contains Sub-process'. The Control Diagram that would be created in this case is shown on the right in FIG. 6. (This control diagram can also be described as being composed of Nodes (Object Types) and Edges (Link Types) as those terms are defined in current graph theory.) To create this Query the user first creates a new tree called 'Process Tree' and populates it by dragging the object types and link types from the Data Store onto the Control Diagram. The Tree is defined using one of the following methods shown in Table III:

TABLE III a. Top-Down Objects
   i. Drag 'Process' object type onto tree
   ii. Drag 'Sub-process object type onto tree below Process
   iii. Accept default link type of 'contains'. If more than one possible link type is defined between the two object types, a pop-up list prompts for the Link Type to be used.
b. Top-Down Object and Link
   i. Drag 'Process' object type onto tree
   ii. Drag 'Process contains Sub-Process' link type onto tree below Process
   iii. 'Sub-Process' object type Node is automatically added to tree
c. (and d.) Bottom-Up Objects/Object and Link
   i. Drag 'Sub-Process' object type onto tree
   ii. Drag either 'Process' object type or 'Process contains Sub-Process' link type onto tree above 'Sub-process'.

Figure 7:
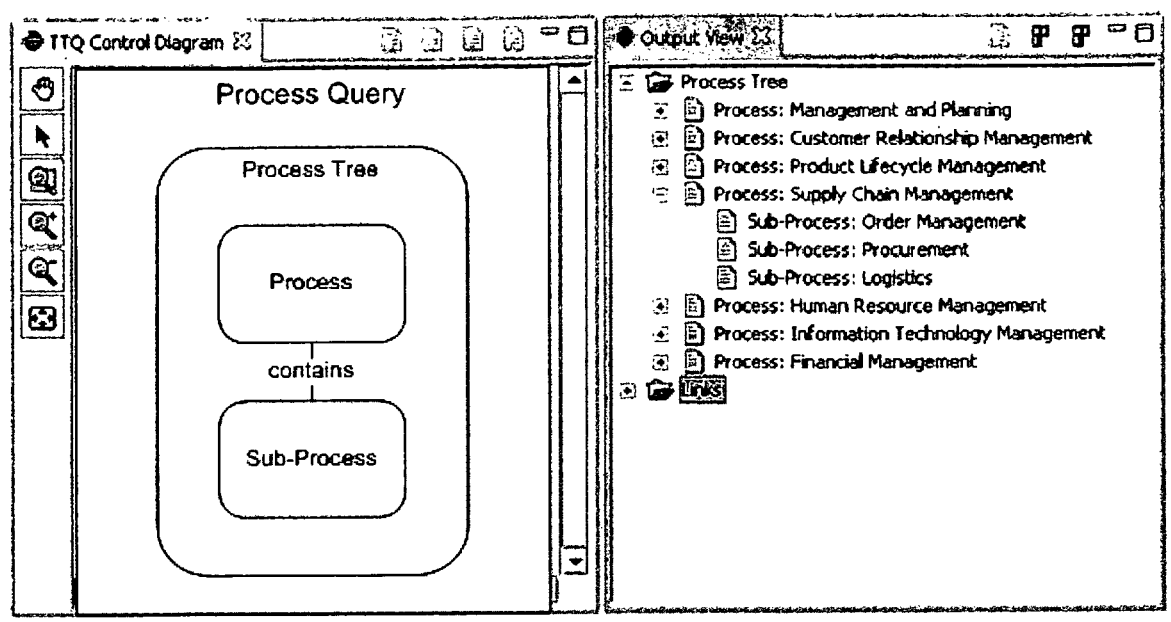
FIG. 7 illustrates a further view of the graphical user-interface of FIG. 4.

The Query definition created in the Control Diagram is used to generate output from the Data Store. Continuing the example above, the Process Query with the two-level Process Tree definition generates data output (the resulting tree) as seen in the Output View on the right in FIG. 7. In FIG. 7, the directionality of the link on the tree (up or down) is defined by the position of the object type nodes in the Control Diagram. Since Process is above Sub-Process in the Control Diagram, Process objects appear as parents above Sub-process objects in the output hierarchy. This directionality is independent of the link's inherent direction. In other words the user can define either Process>Sub-process or Sub-process>Process as the parent-child relationship using the same 'contains' link type. Any valid set of Object Types and Link Types can define a Tree and a given Object Type can be used in numerous different Trees. This gives the user flexibility in defining Trees that answer whatever question is being posed. This is particularly useful in analyzing information that fits into multiple hierarchies e.g. matrix organizations, financial/operational metrics, etc. In certain cases, a user may know which Object Types they wish to query, but may not know the available links between them. The interface of the present invention offers the user the chance to browse the available Link Types between two given Object Types.

Recursive links can be used within Trees. A single Object Type with a recursive Link Type is, in fact, one way to define a Tree. The Control Diagram shown in FIG. 8 expands on the Process Tree by adding a lowest level 'Task' that is a child of Sub-Process and also contains recursive children through the 'Task contains Task' Link Type. Multiple levels of nested Tasks are then created in the Tree being generated.

To allow the Query to define the direction in which a recursive link is oriented relative to the Tree, a 'direction' property is used with allowable values of 'forward' and 'backward'. A 'forward' direction indicates that the forward direction of the link corresponds to the downward direction of the Tree. Whole Tree definitions, for example the 'Process Tree' above, can be saved for reuse so that commonly used trees, such as standard process hierarchies, organization hierarchies, etc. can be quickly copied between Queries. The interface also supports the creation of multiple trees within a single Query. This becomes particularly useful when paired with Tunnels, as described below.

Figure 9:
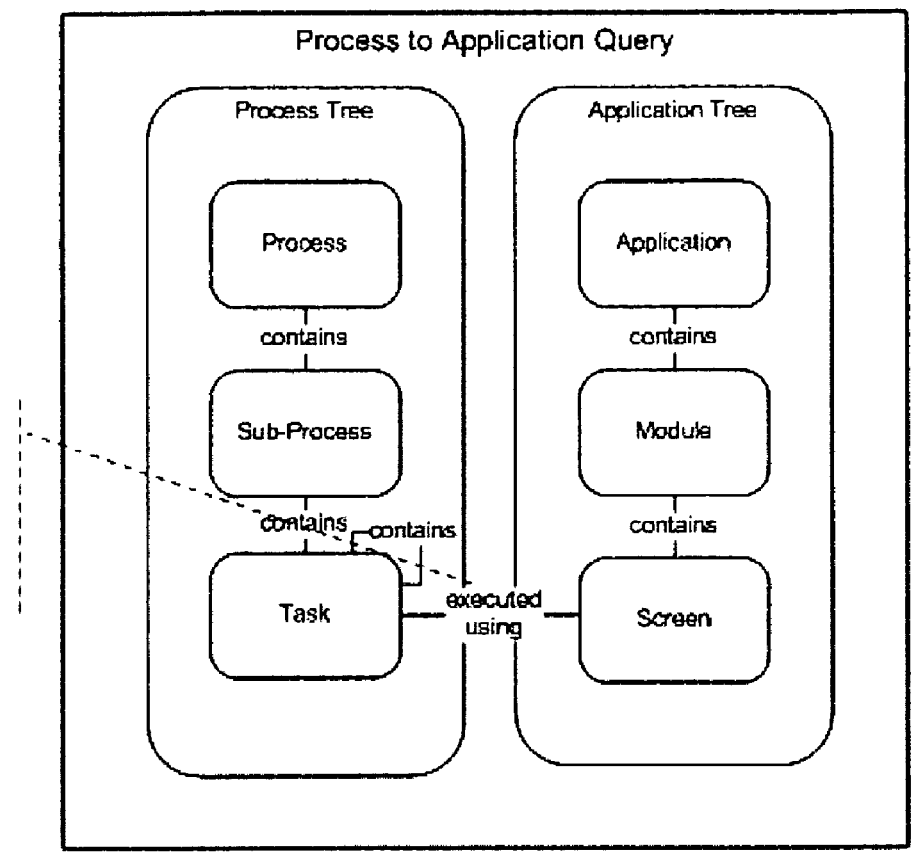
FIG. 9 illustrates a further view of the graphical user-interface of FIG. 4.

One feature of the interface of the present invention is its ability to link Trees together through Tunnels. A Tunnel is simply a Link Type that connects an Object Type on one Tree to an Object Type on another. To continue the Process example above, consider an instance where the user wished to see the links between Business Process and IT Applications. Both exist in their own Tree (as shown in FIG. 9). A link type may then be used to connect Task in the Process tree to Screen in the Application Tree. The Tunnel shown in FIG. 9 using the 'Task executed using Screen' Link Type connects the two hierarchies together, giving the user a way to design complex queries that cross multiple hierarchies.

The output of the interface, at a data level, is one or more data hierarchies made up of objects with their selected properties, and an enumeration of the links between them. This data can be output as XML, or Delimited Text for use in other programs. For example, the interface could be used to take XML from one format to another by creating a single new Tree from an XML data store and outputting it to another XML file. An essential part of the interface is the ability to make useful output from complex data and visualization is a key part of meeting this objective. This is because as the dimensionality of the data goes up, the number of effective ways to visualize it decreases. For a single Tree of data, for example, standard grouping reports work well as do graphical output. (FIG. 10 illustrates a grouped report data output format.) With two linked Trees of data, the grouping report is no longer effective but matrices and graphical output can be used. For data of three or more hierarchical dimensions, graphical output formats such as those shown in FIGS. 1-3 are generated using the interface in order to provide an effective way to view the data.

Matrices are an effective way of presenting two hierarchies of data. With the interface of the present invention, the user creates a matrix by mapping the Tunnel link to a value or symbol within the cells of the matrix and the two Trees become hierarchies on each of the two dimensions of the matrix. FIG. 11 shows a matrix that might result from the Process to Application Query from above (this is a filtered subset of data for readability).

Figure 12:
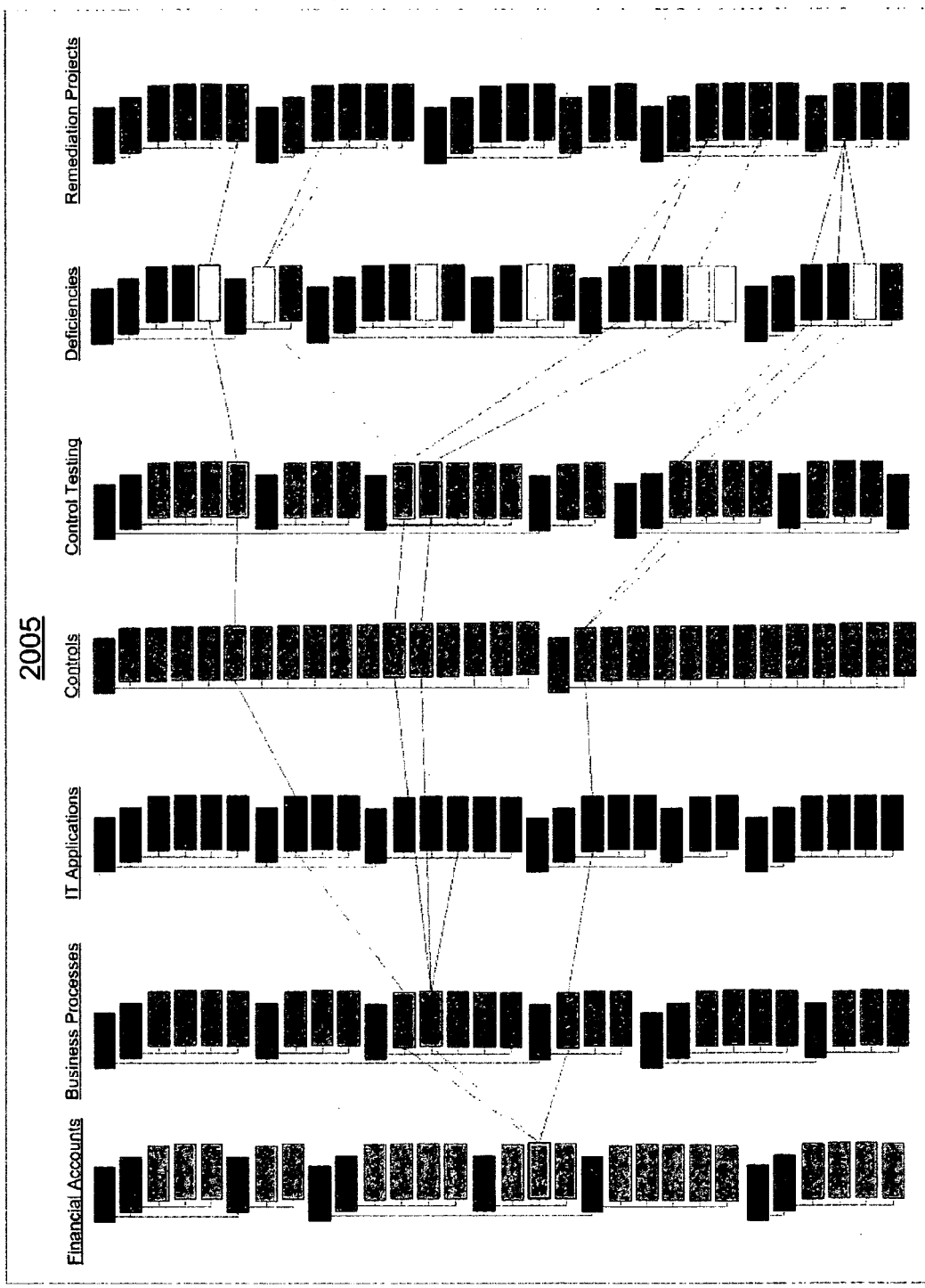
FIG. 12 illustrates an exemplary graphical output report generated by the graphical interface of the present invention.

For data of three or more hierarchical dimensions, graphical output formats are an effective way to view the data. The graphical formats for representing hierarchies are tree layouts and containers. Tree layouts represent hierarchies as nodes arranged in a graphical 'tree' with a root node linked to nodes below. One common use of this format is the standard Organization Chart, though multiple tree layouts can be combined to show relationships among a large number of hierarchies as shown, for example, in FIG. 12.

Object Properties and Link Properties represent the data attributes of Objects and Links respectively. A Property can be stored in a variety of data types including Strings of Text, numbers, dates, etc. Properties are the primary basis for conditional Object and Link Filtering and are also used to format objects in graphical output format. Virtual Objects are Properties that behave like Objects in a Query. They are used in cases where the user wishes to create a level in a Tree that is occupied by Property values rather than actual Objects. For example, the user may wish to create a Tree whose top level is based on the Status Property of Process Objects. Virtual Properties are Objects that behave like Properties in a Query. Virtual Properties are primarily used to keep Queries simple. If the user wants to filter a Tree or Query by a linked Object that doesn't itself belong in the output, it may be easiest to create a Virtual Property from the Object which can then be Filtered using the standard Filtering mechanism of the related Object Type that gets the new Property rather than through a separate Object Type on the Control Diagram.

Figure 13:
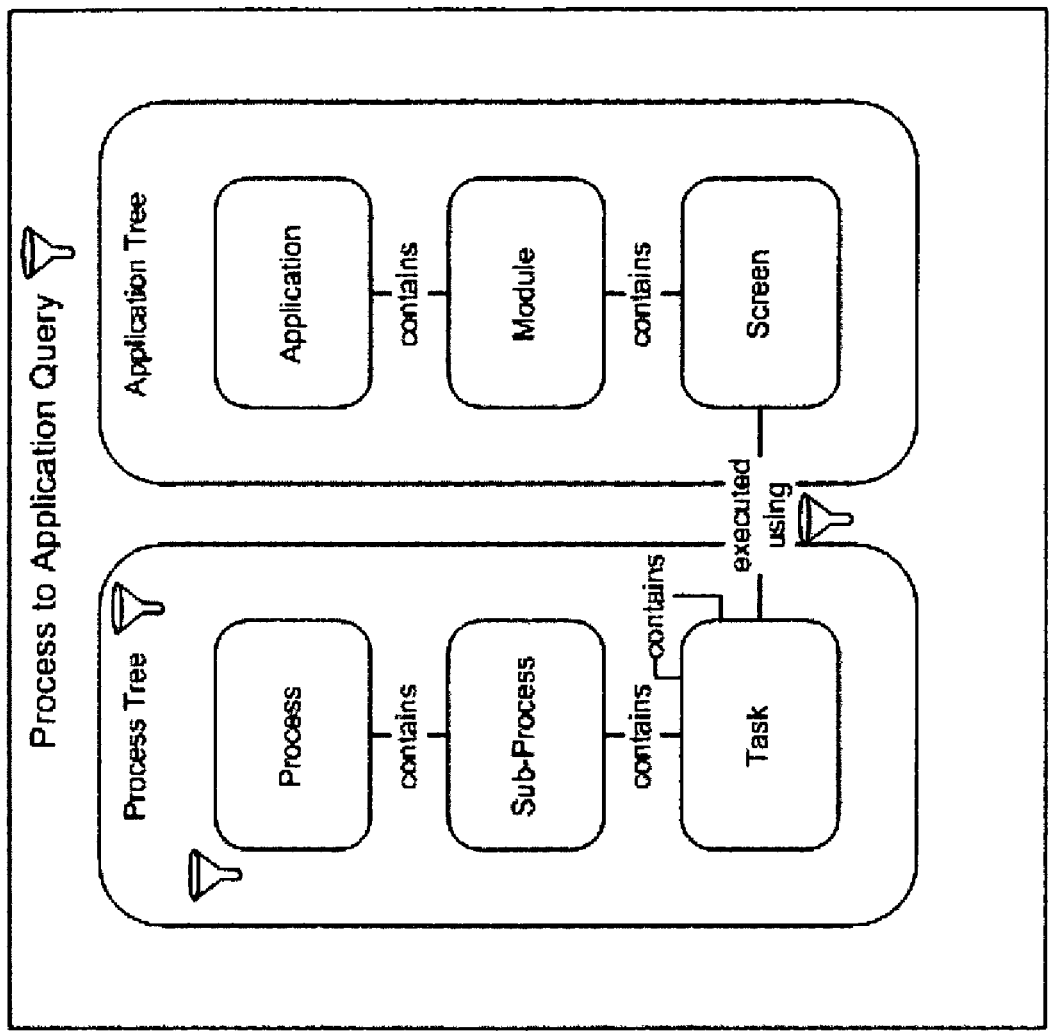
FIG. 13 illustrates the control diagram of the interface of the present invention, including four levels of filters.

Effectively navigating complex knowledge bases requires the ability to limit information to only those elements that are under investigation. The interface of the present invention provides a rich filtering model by allowing the user to apply any number of Filters on a Query at one of four levels: Query level, Tree level, Object level, and Link level. Standard funnel icons are used to represent filters in the Control Diagram, as shown in FIG. 13.

Filters at different levels of the Query have different scopes. Query-level filters effect all data retrieved by the Query, whereas Tree level Filters limit only data within a given Tree. Object and Link-level Filters limit the data within only the Object or Link on which they are applied.

There are two major types of filters: property filters and working set filters. Property filters select objects to include in the output by checking a filter expression against properties of the objects and links within the Filter's scope. So, for example, if the Process Object Type has a Property called Status with allowable values of 'active' and 'inactive', a user might set up a Filter on the Process Object Type that limits results only to Processes with a Status Property of 'active'. Property Filters support standard regular expression filtering including wildcards and ranges.

Property filters at the Query and Tree level are limited to those properties that are universal to all Object Types and Link Types they include. This is useful for broad filters such as Date Range, Active/Inactive, Business Unit and Scenario properties.

Working set filters are only available at the Object and Link level and allow the user to pick those objects that should be returned. The Filter itself returns a working set of objects or links and lets the user select check boxes to indicate those they wish to use.

For ease of use, Filter Sets can be saved which contain a group of Filters that are commonly used. For example, if a user is working on the Order Management Process and is interested in only active Processes, a user can turn Filters off and on without having to recreate the underlying Filter. This is done by making the Filter inactive and is indicated on the Control Diagram by a dotted funnel icon in place of the solid icons used for active filters.

Sub queries allow the user to highlight and examine a subset of the data presented in an output set. A typical use case for this interaction consists of a user: 1) Defining a universe of data to see on a graphic, this will usually involve setting up trees, query and tree level filters, and maybe object filters, link filters and tunnels. Example: "I want to look at the people, processes, and applications involved in executing order entry." The user can then visualize this universe in a graphic; 2) Illuminating a subset of that universe. This action will usually be visualized by a style change (e.g. outline red, links red). Example: "Fred Smith is leaving; show me where he fits in this universe including the processes he executes and the applications he uses." By highlighting this subset within the larger graphic of the universe rather than on its own, the user gets an instant sense of the context of the information; and 3) Viewing multiple subsets. The user may also wish to see two separate subsets to compare them. The second subset would probably be visually distinguished from the first by a different highlight color. Example: "Fred Smith doesn't have much on his plate, how do his processes and applications compare with his peer Mary Jones?"

Figure 14:
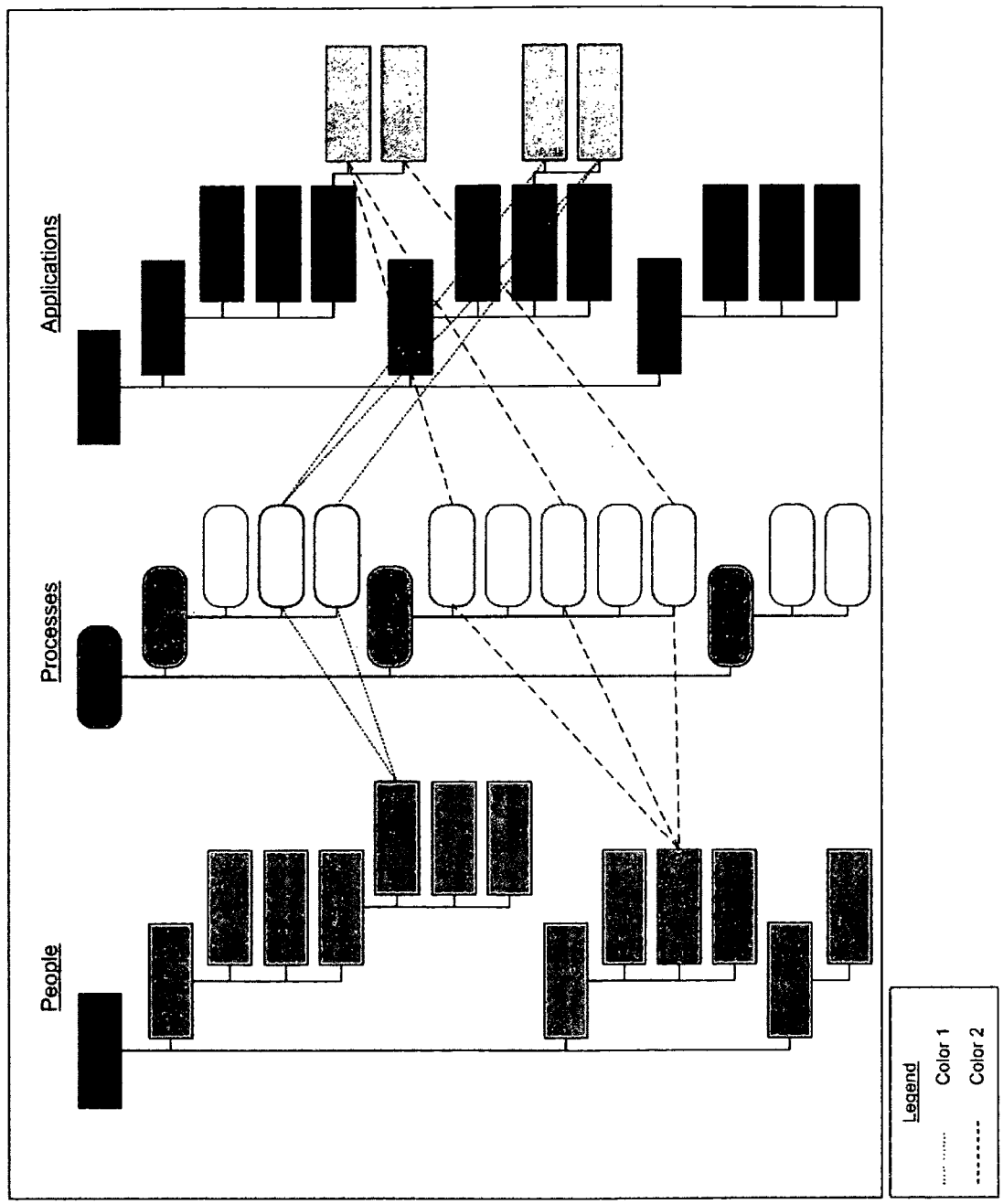
FIG. 14 illustrates an exemplary two color graphic generated by the graphical interface of the present invention.
Figure 15:
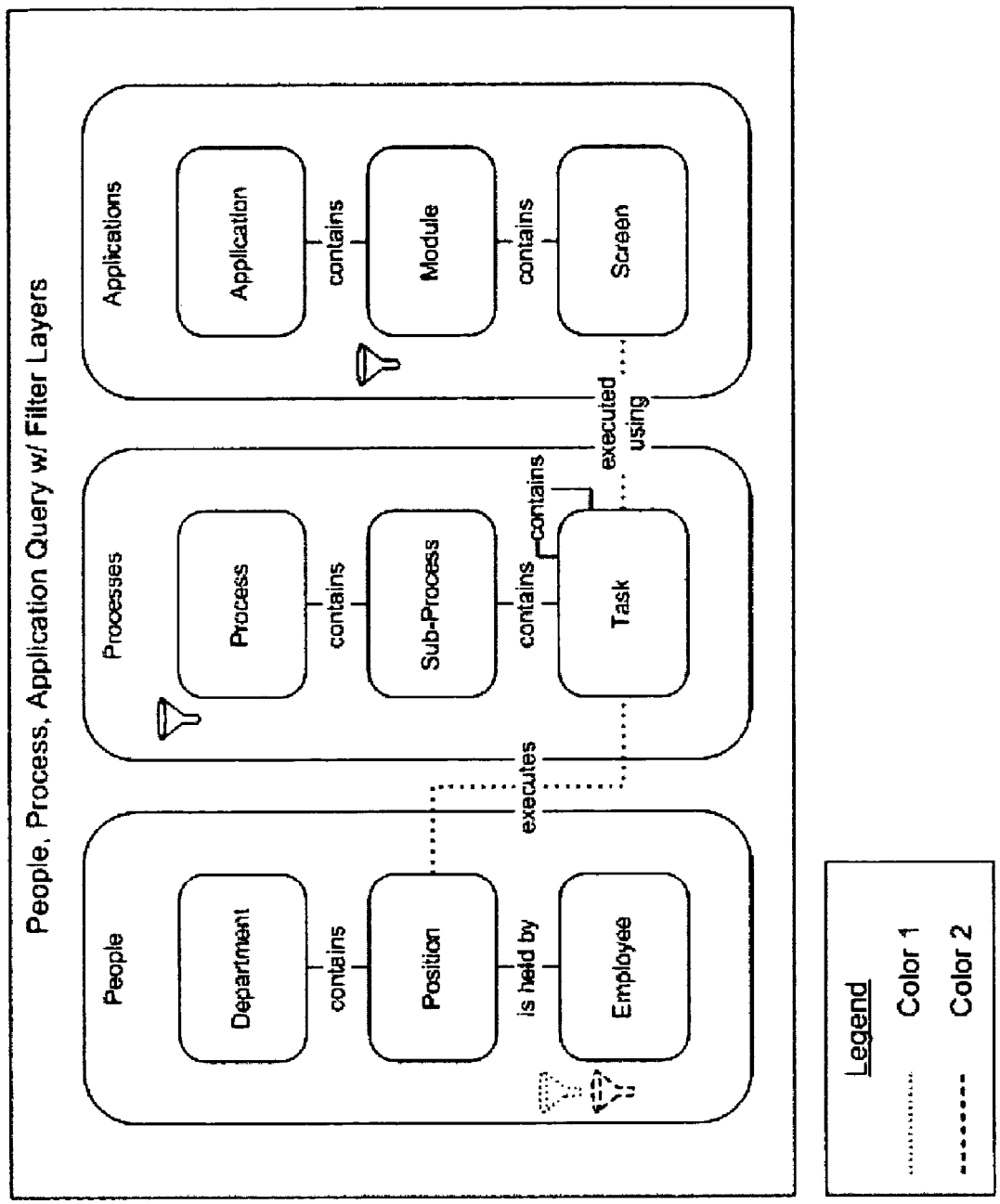
FIG. 15 illustrates a Control Diagram for generating the output shown in FIG. 14.

The image shown in FIG. 14 corresponds to a two color graphic that might be generated from the above example. Within the interface Control diagram, this is controlled by color coded filter icons and tunnel connectors. So, for the example above, the Control Diagram shown in FIG. 15 may be used. In FIG. 15, the filters represented by the black funnels control the scope of all the items on the diagram. The filters represented by the red and orange funnels control what is highlighted on the graphic. Each of these sub queries can be individually turned on and off. The data output from the interface captures not only the universe but all defined subsets. In other words, an application that receives nothing but a data feed out of the interface should be able to determine what items are 'selected' within each sub query.

The mechanism for defining sub query filters is the same as the method for defining filters within the main query. Sub queries do not have any impact on the objects that are returned by the main query, merely whether these objects are considered included in the sub query results. However, sub queries may cause tunnel links to be added to the main query output if those links were not in the main query definition.

In the embodiments shown in FIGS. 1-15, the graphical interface including the functionality for displaying, navigating amongst and manipulating the documents and query results is performed in software by a processor coupled to (or integrated with) the screen or display.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A method of defining a query and generating a resulting hierarchical tree comprising:
   (a) graphically selecting nodes and one or more edges and graphically placing representations of the selected nodes and one or more edges in a graphical user interface in order to create a vertical stack of nodes and one or more edges respectively representing object types and link types;
   (b) defining the query based on the stack; and
   (c) generating the resulting hierarchical tree by applying the query to an underlying data store, wherein a top node of the stack defines one or more top-level elements in the resulting hierarchical tree, a node below the top node of the stack defines child elements of the one or more top-level elements of the resulting hierarchical tree, and an edge of the stack connecting the top node and the node below the top node defines the relationship between the one or more top-level elements and their child elements in the resulting hierarchical tree.

2. The method of claim 1, further comprising including hierarchical information from recursive data links in the query by inserting a graphical edge connecting a node with itself.

3. The method of claim 1, wherein the query is defined to return multiple linked resulting trees, and the stack comprises two or more stacks with an edge between at least one node in each of the two or more stacks.

4. The method of claim 1, further comprising filtering output from the query using one or more filters placed at a query, tree, object or link level and represented within the graphical user interface as one or more icons.

5. The method of claim 2, further comprising filtering output from the query using one or more filters placed at a query, tree, object or link level and represented within the graphical user interface as one or more icons.

6. The method of claim 3, further comprising filtering output from the query using one or more filters placed at a query, tree, object or link level and represented within the graphical user interface as one or more icons.

7. The method of claim 1, further comprising defining sub queries for identifying subsets of data within the query by adding filter icons and inter-tree links to the graphical user interface that are color coded with a specific color corresponding to the sub query.

8. The method of claim 2, further comprising defining sub queries for identifying subsets of data within the query by adding filter icons and inter-tree links to the graphical user interface that are color coded with a specific color corresponding to the sub query.

9. The method of claim 3, further comprising defining sub queries for identifying subsets of data within the query by adding filter icons and inter-tree links to the graphical user interface that are color coded with a specific color corresponding to the sub query.

10. A computer implemented method of defining a query and generating a resulting hierarchical tree comprising:
   (a) graphically selecting nodes and one or more edges and graphically placing representations of the selected nodes and one or more edges in a graphical user interface in order to create a display of nodes and one or more edges respectively representing object types and link types;
   (b) defining the query based on the display; and
   (c) generating and displaying the resulting hierarchical tree in the graphical user interface by applying the query to an underlying data stores,
   wherein a first node of the display defines one or more top-level elements in the resulting hierarchical tree, a second node of the display adjacent to the first node of the display defines one or more child elements of the one or more top-level elements of the resulting hierarchical tree, and an edge of the display connecting the first node of the display and the second node of the display defines a relationship between the one or more top-level elements and the respective one or more child elements in the resulting hierarchical tree.

* * * * *